(12) United States Patent
Gao et al.

(10) Patent No.: US 8,346,913 B2
(45) Date of Patent: Jan. 1, 2013

(54) METHOD AND DEVICE FOR MONITORING AND UPGRADING SOFTWARE IN DEVICE MANAGEMENT

(75) Inventors: Hongtao Gao, Shenzhen (CN); Xiaoyi Dong, Shenzhen (CN); Xiaoqian Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 12/102,255

(22) Filed: Apr. 14, 2008

(65) Prior Publication Data

US 2008/0195693 A1    Aug. 14, 2008

Related U.S. Application Data

(63) Continuation of application No. PCT/CN2006/002853, filed on Oct. 25, 2006.

(30) Foreign Application Priority Data

Oct. 25, 2005    (CN) .......................... 2005 1 0114710

(51) Int. Cl.
*G06F 15/16* (2006.01)
*G06F 15/173* (2006.01)

(52) U.S. Cl. ..................... 709/224; 709/203; 709/219

(58) Field of Classification Search .................. 709/223, 709/224

See application file for complete search history.

(56) References Cited

U.S. PATENT DOCUMENTS

| | | | |
|---|---|---|---|
| 5,797,016 A | 8/1998 | Chen et al. | |
| 5,995,754 A | 11/1999 | Holzle et al. | |
| 6,199,204 B1 | 3/2001 | Donohue et al. | |
| 7,822,862 B2 * | 10/2010 | Slater et al. | 709/229 |
| 2001/0029178 A1 | 10/2001 | Criss et al. | |
| 2002/0178254 A1 * | 11/2002 | Brittenham et al. | 709/224 |
| 2005/0021693 A1 | 1/2005 | Tsuda et al. | |
| 2005/0227683 A1 | 10/2005 | Draluk et al. | |

FOREIGN PATENT DOCUMENTS

| | | |
|---|---|---|
| CN | 1234551 A | 11/1999 |
| CN | 1410901 A | 4/2003 |
| CN | 1461230 A | 12/2003 |
| CN | 1510562 | 7/2004 |
| CN | 1535061 A | 10/2004 |
| CN | 1553313 A | 12/2004 |
| CN | 1629855 A | 6/2005 |
| CN | 1663812 A | 9/2005 |
| CN | 1673969 A | 9/2005 |

OTHER PUBLICATIONS

International Search Report for International Application No. PCT/CN2006/002853, dated Feb. 8, 2007, and English translation.

(Continued)

*Primary Examiner* — Ian N Moore
*Assistant Examiner* — Afshawn Towfighi
(74) *Attorney, Agent, or Firm* — Slater and Matsil, LLP (57) ABSTRACT

A method for monitoring and upgrading software in device management includes: monitoring use frequency of software of terminal equipment and storing use frequency information of software; and providing the use frequency information of software to a device management server. Further, a method for upgrading software in device management, includes: monitoring use frequency information of software on terminal equipment and providing corresponding use frequency information of the software to a device management server; and by the device management server, determining by using the use frequency information of software to be upgraded, whether the software to be upgraded satisfies conditions for upgrading, and if the software to be upgraded satisfies the conditions for upgrading, delivering operations for upgrading the software to upgrade the software; otherwise, abandoning the upgrading of the software.

7 Claims, 4 Drawing Sheets

OTHER PUBLICATIONS

Chinese Office Action for Chinese Patent Application No. 200510114710.8, dated Aug. 24, 2007, and partial English translation thereof.

Chinese Office Action for Chinese Patent Application No. 200510114710.8, dated May 30, 2008, and partial English translation thereof.

* cited by examiner

Fig. 1

Prior Art

METHOD AND DEVICE FOR MONITORING AND UPGRADING SOFTWARE IN DEVICE MANAGEMENT

CROSS-REFERENCE TO RELATED APPLICATIONS

This application is a continuation of International Application No. PCT/CN2006/002853, filed Oct. 25, 2006. This application claims the benefit of Chinese Application No. 200510114710.8, filed Oct. 25, 2005. The disclosures of the above applications are incorporated herein by reference.

FIELD

This disclosure relates to device management technique in communications field and to a method and device for monitoring and upgrading software in device management.

BACKGROUND

The statements in this section merely provide background information related to the present disclosure and may not constitute prior art.

With the development of mobile network and convergence of the mobile network and Internet, subscribers of mobile network may be provided with more and more Value Added Service. On the one hand, subscribers desire to access abundant information and mobile Value Added Service conveniently via terminals, such as PDA, laptop, mobile phone, PC, game controller and TV. On the other hand, they generally want them without complicated work, for example, to download software or set parameters manually.

To resolve the above problem, device management technology is developed. In accordance with the Device Management protocol, a Device Management (DM) server may, in Over-The-Air (OTA) manner, provide the subscribers with a series of services such as terminal firmware update, device diagnostic, parameter configuration (setting) and software auto-download and installation.

In other words the DM server which is provided by Open Mobile Alliance (OMA) device, offer a mechanism of managing terminal equipment. The managing operations include: parameter setting, firmware update, software installation and upgrade, application setting, collection and disposal of device errors and event information, for the terminal equipment.

Figure 1:
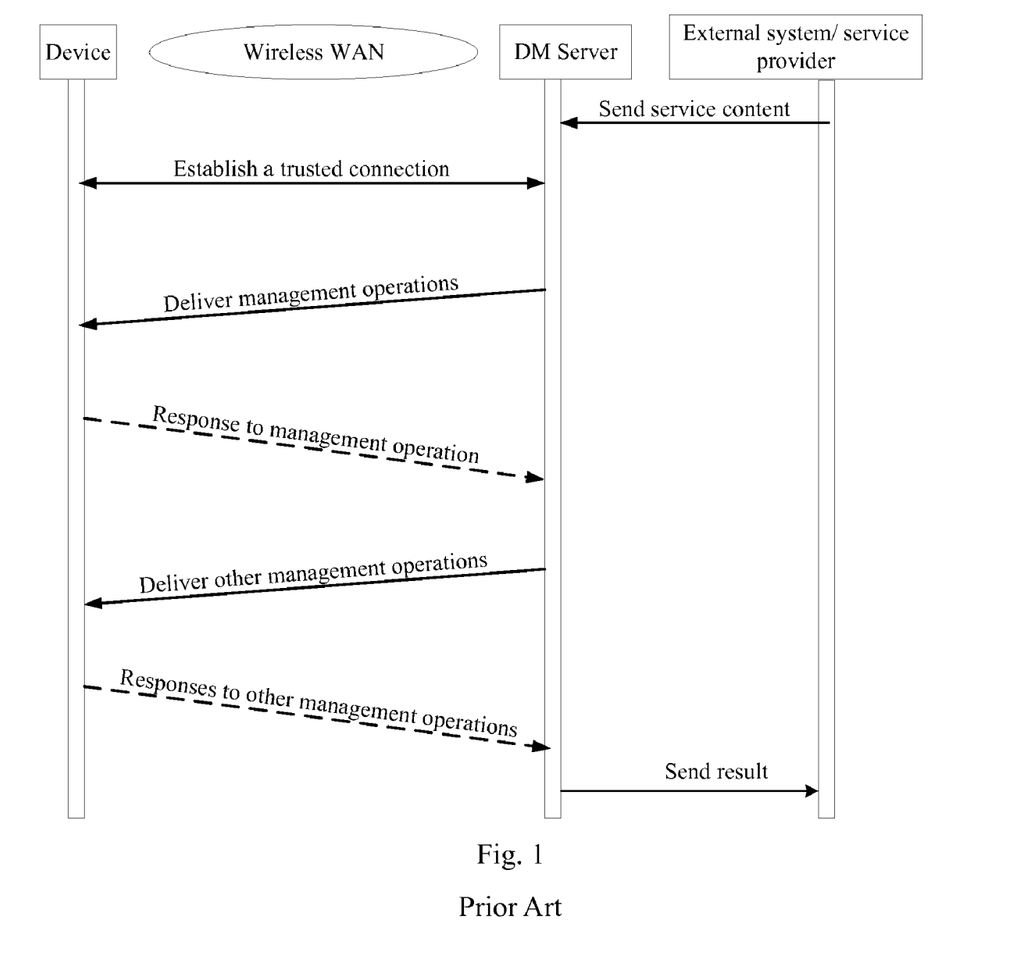
FIG. 1 is a flow chart of a device management service managing terminal equipment in the prior art.

The mechanism of terminal management is as shown in FIG. 1.

Step 1: An external system sends one or more management operations to a DM server. In some embodiments, the external system may be mobile operators managing the DM server or a third party software and (or) service provider.

Step 2: A connection is established between the DM server and terminal equipment.

Step 3: The DM server sends the one or more management operations to the terminal equipment.

Step 4: The terminal equipment performs the one or more operations and returns operation status information.

Step 5: If there are other operations, the DM server sends the operations to the terminal equipment; otherwise, the DM server returns a confirmation message.

Step 6: In response to receiving the management operations from the DM server, the terminal equipment performs the operations and returns operation status information, otherwise, the session ends.

Step 7: The DM server returns the operation result to the external system.

Figure 2:
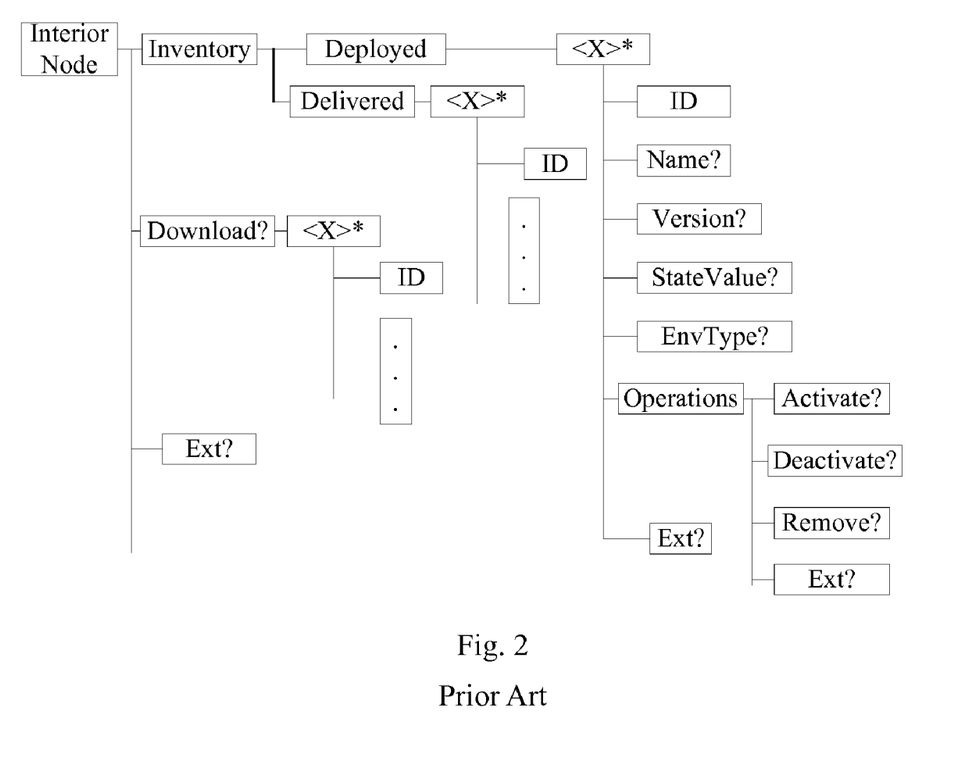
FIG. 2 is a schematic drawing showing the structure of the management object in the terminal equipment in the prior art.

As mentioned above, the DM server implements functions of software installation and upgrade in the terminal equipment, in the OTA manner. It can be called management of software components (or software components management). As shown in FIG. 2, a set of management objects of software components management are set in the terminal equipment to manage terminal software. In FIG. 2, the node Inventory indicates software currently in the terminal equipment. The node Inventory\Deployed indicates the installed software, recording name and version of the software and operations to be performed (such as activation, deactivation and deletion). The node Inventory\Delivered (sub nodes are not marked) indicates software downloaded into the terminal equipment but not installed, recording name and version of the software, operations to be implemented (such as upgrade, installation & activation and upgrade & activation). The node Download (sub nodes are not marked) indicates information that a terminal is to acquire from a DM server or other designated servers, including name and version of the software, URL of download location, and operations to be implemented (such as download, download & installation, download & installation & activation and download & update).

The software upgrade method is as follows:

Step 1: A service provider sends a software upgrade command to terminal equipment via a DM server.

Step 2: The terminal equipment prompts users or subscribers to install update package.

Step 3: The terminal equipment returns the user's selection to the DM server after the user makes a selection.

Step 4: The DM server initiates operations for software download, update and implementation.

Step 5: The terminal equipment returns a confirmation message to the DM server after implementing the operations.

In the existing device management technology, use information of software in the terminal equipment is not monitored and therefore the DM server may not acquire the use frequency of software of the terminal equipment. The Software is not marked and differentiated during upgrade. Many users install software which is unused or seldom used later due to some reasons but upgrade may be implemented to the unused or seldom used software. Therefore, the upgrade of the software which is not often used brings some issues:

Unnecessary burden is added to the network. The reason is, the mobile network bandwidth is quite low but download firmware and software may consume a lot of bandwidth.

User's experience of service is weakened. There are many kinds of software in the terminal equipment and too many prompts for a user to upgrade software he or she seldom uses weaken the user experience.

Parts of terminal equipment resources are unnecessarily consumed. Upgrade for the software a user seldom uses wastes the storage resources of the terminal equipment because the storage capacity of terminal equipment is limited.

SUMMARY

Some embodiments provide a method for monitoring software use frequency in device management in order to solve a problem that the device management server in the existing device management can not acquire the use frequency of software of terminal equipment.

Various other embodiments provide a method and apparatus for upgrading software in device management to solve a problem in the prior art that users' use information of software is not differentiated during the software upgrade, network resources and terminal equipment resources are unnecessarily consumed and user experience is affected.

A method for monitoring software use frequency in device management includes: monitoring use frequency of software of terminal equipment and storing use frequency information of software; and providing the use frequency information of software to a device management server.

The use frequency information of software is reported by the terminal equipment to the device management server timely; or the use frequency information of software is obtained by the device management server from the terminal equipment.

A monitoring program is informed of the startup of the software on the terminal equipment, and the use frequency information of software is updated by the monitoring program; or the monitoring program periodically traverses a running application and updates the use frequency information of software in response to detecting a new running of software.

Node storage information is added on a management tree of the terminal equipment; or, a monitoring list of software to be monitored is delivered by the device management server to the terminal equipment, and the use frequency information of software is stored by the terminal equipment into the monitoring list.

The use frequency information includes use times and/or a latest use date.

A method for upgrading software in device management includes: monitoring use frequency information of software on terminal equipment and providing corresponding use frequency information of software to a device management server; and by the device management server, determining by using use frequency information of software to be upgraded, whether the software to be upgraded satisfies conditions for upgrading, and if the software to be upgraded satisfies the conditions for upgrading, delivering operations for upgrading the software to upgrade the software; otherwise, abandoning the upgrading of the software.

The use frequency information of software is reported by the terminal equipment to the device management server timely; or the use frequency information of software is obtained by the device management server from the terminal equipment.

A monitoring program is informed of the startup of the software on the terminal equipment, and use frequency information of software is updated by the monitoring program; or the monitoring program periodically traverses a running application and updates the use frequency information of software in response to detecting a new running of software.

Node storage information is added on a management tree of the terminal equipment; or, a monitoring list of software to be monitored is delivered by the device management server to the terminal equipment, and the use frequency information of software is stored by the terminal equipment into the monitoring list.

The use frequency information includes use times and/or a latest use date.

The device management server compares the use frequency information including use times and/or latest use date of the software with a predetermined value, to determine whether upgrade conditions are met.

Services of software upgrade are divided into different levels in accordance with the use frequency of software in the device management server; the device management server updates levels of the software in accordance with the use frequency of software and determines whether the upgrade conditions are met in accordance with the upgrade strategy and current level of the software.

Terminal equipment including a device management agent module adapted to communicate with a device management server, further includes: a monitoring module, adapted to monitor use frequency information of software of the terminal equipment; and a storage module, adapted to store the use frequency information of software provided by the monitoring module.

The monitoring module and the storage module are configured in the device management agent server.

A device management server includes a communication module adapted to communicate with terminal equipment, and the device management server further includes: a determining module, adapted to determine by using use frequency information of software provided by terminal equipment whether the software satisfies conditions for upgrading; and an upgrading module, adapted to control the terminal equipment to upgrade the software in response to determining that the software satisfies the conditions for upgrading.

The device management server determines whether to upgrade the software in accordance with the use frequency information of software that can be upgraded in the terminal equipment, so that the unnecessary upgrade for the unused or seldom used software can be avoided. As a result, network resources and terminal resources may be saved effectively, user experience may be improved and it is convenient and beneficial for operators and service providers to make statistics of user satisfaction degree and market share.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In some embodiments, in the device management, use frequency of software is monitored, which allows a Device Management (DM) Server to acquire use information of software in terminal equipment.

Further, the DM server determines whether upgrade conditions are met, in accordance with the use frequency information of software to be upgraded, before upgrading the software in the terminal equipment. If the upgrade conditions are met, the DM server delivers corresponding operations for upgrade; otherwise, the software upgrade process is terminated.

Figure 3:
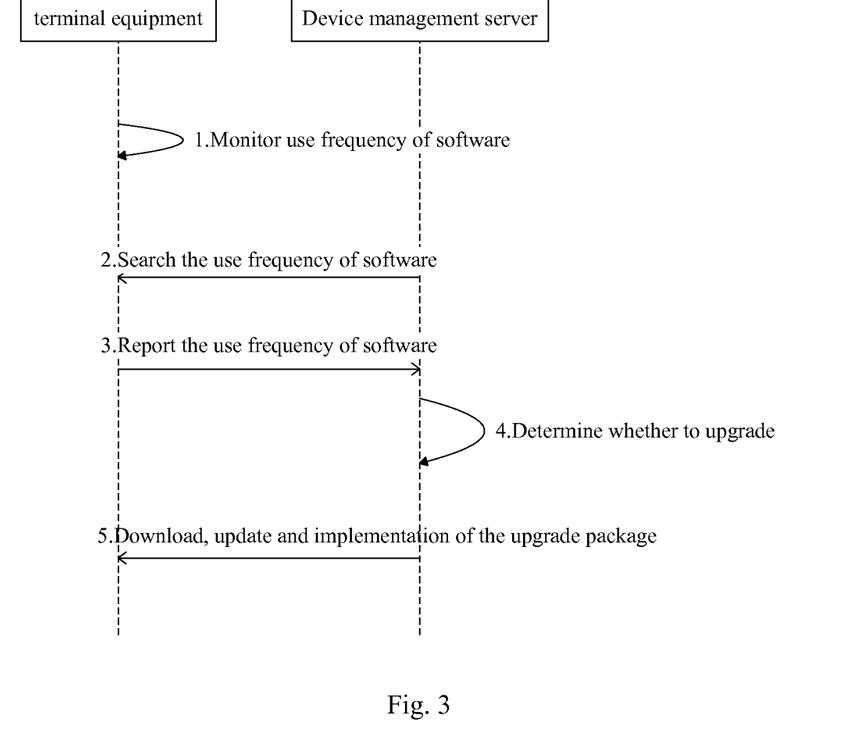
FIG. 3 is a flow chart of the management device upgrading software according to various embodiments.

Referring to FIG. 3, the procedures for the DM server to upgrade software in the terminal equipment are as follows:

Step 1: A DM Agent in the terminal equipment monitors use frequency of software in the terminal equipment and stores the use frequency information.

Step 2: The DM server sends an acquirement request about the use frequency of software to the terminal equipment, in a collection strategy.

Step 3: The terminal equipment returns the use frequency information of software to the DM server, according to the collection strategy.

In Step 2-Step 3, the collection strategy may be collecting by the DM server periodically from terminal equipment, or collecting by the DM server on-demand from terminal equipment. In other embodiments, the collection strategy may be reporting by terminal equipment periodically, or other strategies provided by operators/service providers.

In various embodiments, when the strategies of collecting periodically or collecting on-demand by the DM server from terminal equipment are adopted, the DM server establishes a session with the terminal in accordance with the existing DM protocol, and acquires the use frequency information stored in the terminal management tree or files via GET command.

In other various embodiments, when the strategy of reporting periodically by terminal equipment is adopted, the DM Agent in the terminal equipment may report the use frequency of software via Generic Alert after establishing a session with the DM server.

Step 4: The DM server determines whether to upgrade software in the terminal equipment in accordance with the use frequency of software and the upgrade strategy.

The upgrade strategy is described more specifically later.

Step 5: The procedure ends if the DM server determines not to upgrade the software in the terminal equipment. If the DM server determines to upgrade the software in the terminal equipment, download, update and implementation of the upgrade package is performed in accordance with the existing method for software upgrade, and the terminal equipment returns status result.

Figure 4:
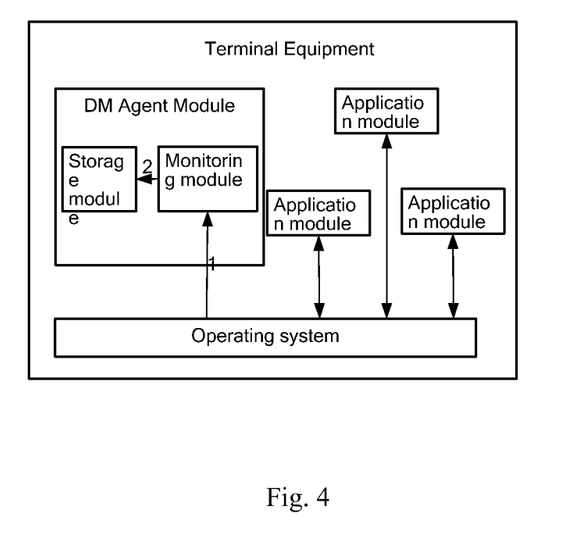
FIG. 4 is a schematic drawing of the structure of the terminal equipment according to various embodiments.

As shown in FIG. 4, terminal equipment, which can be used in the above method and system, includes: an operating system, a DM Agent and one or more application module monitored (for example, a first application module, a second application module and a third application module). The terminal equipment further includes a monitoring module and a storage nodule.

The operating system is applied to manage the DM Agent module and the application modules monitored.

The DM Agent is adapted to communicate with the DM server, report information to the DM server and receive information the DM sever delivers.

The monitoring module is adapted to monitor use frequency of software of the terminal equipment.

The storage module is adapted to store use frequency information monitored by the monitoring module. The use frequency information may include use times, use times in an interval, and/or latest use date. When the monitoring module detects a new running occurring in an application, the use times and latest use date of the software is updated.

In various embodiments, the monitoring module and storage module are arranged in the DM Agent module.

Two manners or methods can be adopted for the monitoring module to monitor the use frequency of software.

In various embodiments, the monitoring unit searches the list of running applications periodically and search methods in different operating system vary.

For example, Symbian operating system provides TFindProcess interface for an application. The function of the interface is to traverse the running process and determine whether the process is running in accordance with process names. The monitoring unit invokes the interface function periodically and acquires the name of a running application. If it is detected for many times that a process is running, the monitoring unit may determine the times of the running process by start-up time of each of the running process detected.

In other embodiments, when the monitored application is running, the operation system notifies the monitoring module of this running.

For the storage module, Use frequency information may be stored through management object method, or diagnosis list method.

Figure 5:
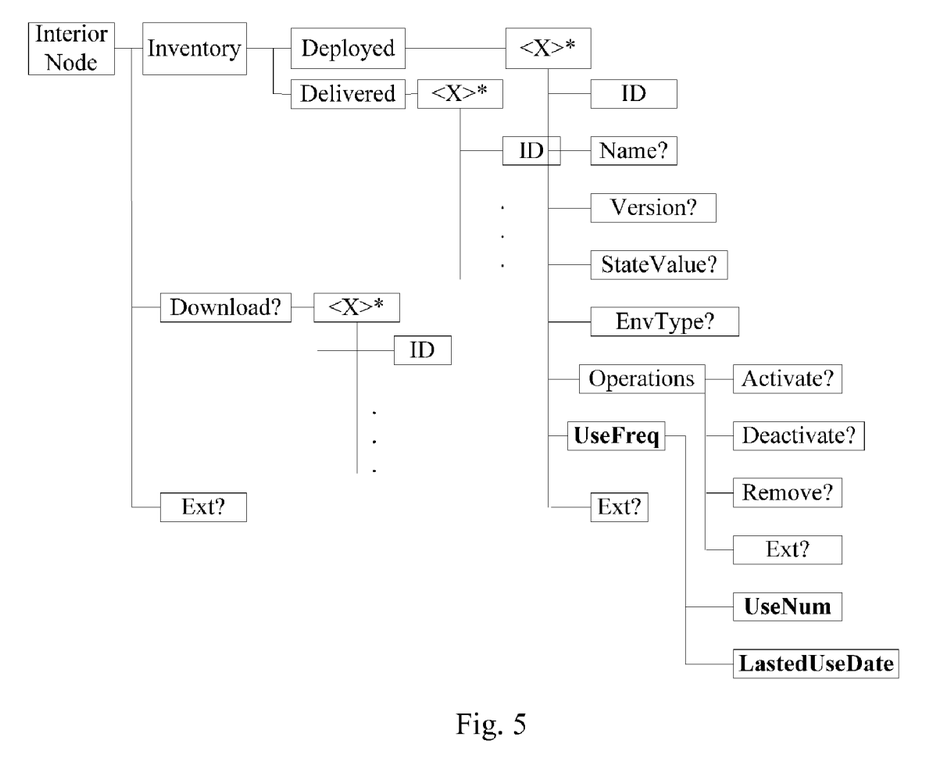
FIG. 5 is a schematic drawing of the node adding and storing use frequency information in the management tree in various embodiments.

In various embodiments, the management object method is adopted. A node for recording the use frequency of software is added in the management object of software components, for example, the node named UseFreq. The UseFreq node may include two nodes, for example, respectively named UseNum and LatestUseDate. The UseNum node records use times (or use frequency) of the software and the LatestUseDate records the latest date of using the software.

An example of the above management object is shown in FIG. 5. In this example, the node Inventory indicates software currently in the terminal equipment, the node Inventory\Delivered (sub nodes are not marked) indicates software downloaded into the terminal equipment but not installed. In this example, a node for recording use frequency of software is added under the Inventory\Deployed node, because the use frequency of software installed needs to be monitored. In the example, the node for recording use frequency of software is UseFreq node, which includes two nodes: UseNum node and LatestUseDate node.

One skilled in the art will recognize that the node (nodes) for recording use frequency of software may have other names, and the location of the node (nodes) on the node tree may be different. Any way or manner of recording use times and/or latest use date of the software is within the scope of this disclosure.

In other embodiments, the diagnosis list method is adopted. A DM server delivers in advance a monitoring list document, listing terminal events that the DM server expects a DM Agent to monitor. If the list includes use frequency of software of the terminal, the DM Agent monitors running of the software in real time. Once detecting that the software is running, the DM Agent add one in the item of Use Num, and rewrite the Latest Use Date. An example of the monitoring list is shown in the following table:

| Category | Item | | Description |
|---|---|---|---|
| Application Info | | | information of defined application |
| | App 1 ID | | unique identifier of application 1 |
| | | Name | readable application name for users |
| | | Version | version of application |
| | | Use Num | use times of application |
| | | Latest Use Date | latest use date of application |
| | App 2 ID | | unique identifier of application 2 |
| | | Manufacturer | readable application name for users |
| | | Version | version of application |
| | | Use Num | use times of application |
| | | Latest Use Date | latest use date of application |

In the above table, the terminal equipment may write use frequency information into blanks of the column Item.

Figure 6:
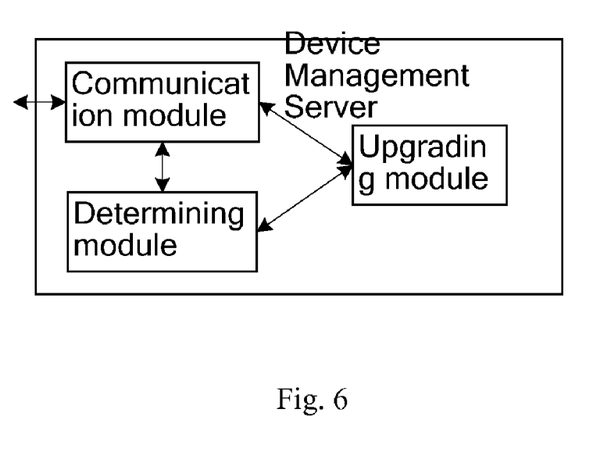
FIG. 6 is a schematic drawing of the device management server according to various embodiments.

Correspondingly, structure of a DM server is shown in FIG. 6, which includes a communication module, a determining module and an upgrading module. Plus: Other functional modules implementing existing functions are not listed.

The communication module is adapted to communicate with terminal equipment, for example, to receive information reported by the terminal equipment and deliver operation commands and related information.

The upgrading module and the determining module are in logical communication with the communication module.

The upgrading module is adapted to instruct the terminal equipment to upgrade software when the determining module determines that upgrade conditions are met.

The DM server is preset with collection strategies and upgrade strategies which may be used for the software upgrade. The collection strategy may be strategies collected periodically from a terminal, or obtained from the terminal if necessary, or other strategies set by an operator or SP.

In various embodiments, the upgrade strategy may be: determining whether to upgrade software, in accordance with a comparison between use times reported by the terminal equipment and a corresponding predetermined value, or a comparison between use frequency calculated in accordance with the use times and a corresponding predetermined value, or a comparison between the latest use date and a corresponding predetermined value, or a combination of the use times or frequency and the latest use date.

The upgrade strategy may be divided into levels, for example, Level 1, Level 2 and Level 3. The number of levels may be determined and modified in accordance with the strategy of an operator. The levels and the use frequency information of software are interrelated. In other words, the relationship between ID of terminal software, use frequency information of software and the service level is stored in one or more related databases or documents. After acquiring use frequency of terminal software, the DM server modifies the service level in accordance with use frequency. For example, the more frequently used software obtains a higher level. When services offered by the terminal software need to be implemented, whether to upgrade the software and which additional services to be provided are determined in accordance with the service level of the service needed in the software. The DM server determines whether to upgrade the terminal software after acquiring the use frequency of terminal software in this manner, which makes the establishment and modification of the upgrade strategy more flexible.

Upgrade of software of a terminal is selectively performed in accordance with statistics of users' use frequency of software, so that network resources and terminal equipment resources may be saved and user experience may be improved.

The above are only exemplary embodiments and are not use for limiting the scope of the present teachings. It is apparent that those skilled in the art can make various modifications and variations without departing from the principle and scope of the present teachings. The present teachings are intended to cover all the modification and variations falling in the protection scope defined by the following claims and their equivalents.

What is claimed is:

1. A method for upgrading software in device management, comprising:
   monitoring, at a terminal equipment, use frequency information of software running on the terminal equipment; the use frequency information of software includes use times of the software in a period of time;
   storing the use frequency information of the software at a management tree on the terminal equipment through adding or updating one or more nodes at the management tree, each of the nodes representing a management object for a software component running on the terminal equipment;
   receiving, by a device management server, the use frequency information of software provided by the terminal equipment;
   determining, by the device management server, whether software to be upgraded on the terminal equipment satisfies conditions for upgrading by using the use frequency information of software on the terminal equipment; and
   delivering operations for upgrading the software to be upgraded on the terminal equipment if the software to be upgraded on the terminal equipment satisfies the conditions for upgrading; otherwise, abandoning the operations;
   wherein, the use frequency information further comprises a latest use date of the software on the terminal equipment.

2. The method of claim 1, wherein the device management server compares the use frequency information with a predetermined value to determine whether upgrade conditions are met.

3. The method of claim 1, wherein services of software upgrade are divided into different levels, by the device management server, in accordance with the use frequency of software; the device management server updates levels of the software in accordance with the use frequency of software and determine whether the upgrade conditions are met in accordance with the upgrade strategy and current level of the software.

4. The method of claim 1, wherein, the use frequency information of software is reported by the terminal equipment to the device management server periodically; or the use frequency information of software is collected by the device management server from the terminal equipment.

5. The method of claim 1, wherein a monitoring program is informed of a startup of an application on the terminal equipment and the use frequency information of software is updated by the monitoring program; or
   the monitoring program periodically traverses running applications on the terminal equipment and updates the use frequency information of software in response to detecting a new running of an application.

6. The method of claim 1, wherein, node for storing use frequency information of software is added on a management tree of the terminal equipment; or, a monitoring list of software to be monitored is delivered by the device management server to the terminal equipment, and the use frequency information of software is stored by the terminal equipment into the monitoring list.

7. A device management server comprising:
   a communication module adapted to communicate with a terminal equipment;
   a determining module, adapted to determine, by using use frequency information of software which is monitored on the terminal equipment through adding one or more nodes for storing the use frequency information of software on a management tree of the terminal equipment and provided by the terminal equipment, whether software on the terminal equipment satisfies conditions for upgrading, the software running on the terminal equipment; the use frequency information of software includes use times of the software in a period of time; and an upgrading module, adapted to control the terminal equipment to upgrade the software on the terminal equipment in response to a determination that the software on the terminal equipment satisfies the conditions for upgrading;

wherein the use frequency information further comprises a latest use date of the software on the terminal equipment.

* * * * *